(12) United States Patent
Yoshihara

(10) Patent No.: US 11,509,103 B2
(45) Date of Patent: Nov. 22, 2022

(54) ELECTRICAL JUNCTION BOX AND METHOD FOR MANUFACTURING ELECTRICAL JUNCTION BOX

(71) Applicant: Sumitomo Wiring Systems, Ltd., Mie (JP)

(72) Inventor: Hiroki Yoshihara, Mie (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 613 days.

(21) Appl. No.: 16/569,916

(22) Filed: Sep. 13, 2019

(65) Prior Publication Data

US 2020/0091666 A1 Mar. 19, 2020

(30) Foreign Application Priority Data

Sep. 14, 2018 (JP) .............................. JP2018-172752

(51) Int. Cl.
| | |
|---|---|
| *H01R 25/16* | (2006.01) |
| *H01R 43/00* | (2006.01) |
| *H01R 4/30* | (2006.01) |
| *H01R 13/74* | (2006.01) |
| *H01R 13/50* | (2006.01) |
| *B29C 45/26* | (2006.01) |
| *H01R 13/502* | (2006.01) |
| *B60R 16/023* | (2006.01) |
| *B29L 31/34* | (2006.01) |

(52) U.S. Cl.
CPC ....... *H01R 25/162* (2013.01); *B29C 45/2628* (2013.01); *H01R 4/308* (2013.01); *H01R 13/50* (2013.01); *H01R 13/502* (2013.01); *H01R 13/748* (2013.01); *H01R 25/165* (2013.01); *H01R 43/00* (2013.01); *B29L 2031/3481* (2013.01); *B60R 16/0238* (2013.01); *H01R 2201/26* (2013.01)

(58) Field of Classification Search
CPC .......... H02G 3/16; H01R 13/73; H01R 43/20; H01R 25/162
See application file for complete search history.

(56) References Cited

U.S. PATENT DOCUMENTS

| | | | | |
|---|---|---|---|---|
| 8,207,454 B2 * | 6/2012 | Darr | ....................... | H05K 7/026 |
| | | | | 174/520 |
| 2002/0037670 A1 * | 3/2002 | Wilmes | .................... | H01R 9/26 |
| | | | | 439/709 |

FOREIGN PATENT DOCUMENTS

| | | | |
|---|---|---|---|
| DE | 19921960 C1 | * | 5/1999 |
| EP | 3396970 | * | 10/2018 |
| JP | 2014-236621 A | | 12/2014 |

* cited by examiner

*Primary Examiner* — Jean F Duverne
(74) *Attorney, Agent, or Firm* — Honigman LLP

(57) ABSTRACT

Provided are an electrical junction box for which the time required for production is short, and a method for manufacturing the electrical junction box. An electrical junction box houses an electric device. A plurality of external devices are connected to each other via the electric device housed in the electrical junction box. The electrical junction box includes a housing box and a connector. The housing box is provided with an insertion port 40 into which the connector is inserted, and an opposite opening that is opposite to the insertion port. The insertion port and the opposite opening have the same axial direction. Inside the housing box, a component can be attached to the connector.

9 Claims, 7 Drawing Sheets

[FIG. 1]

[FIG. 3]
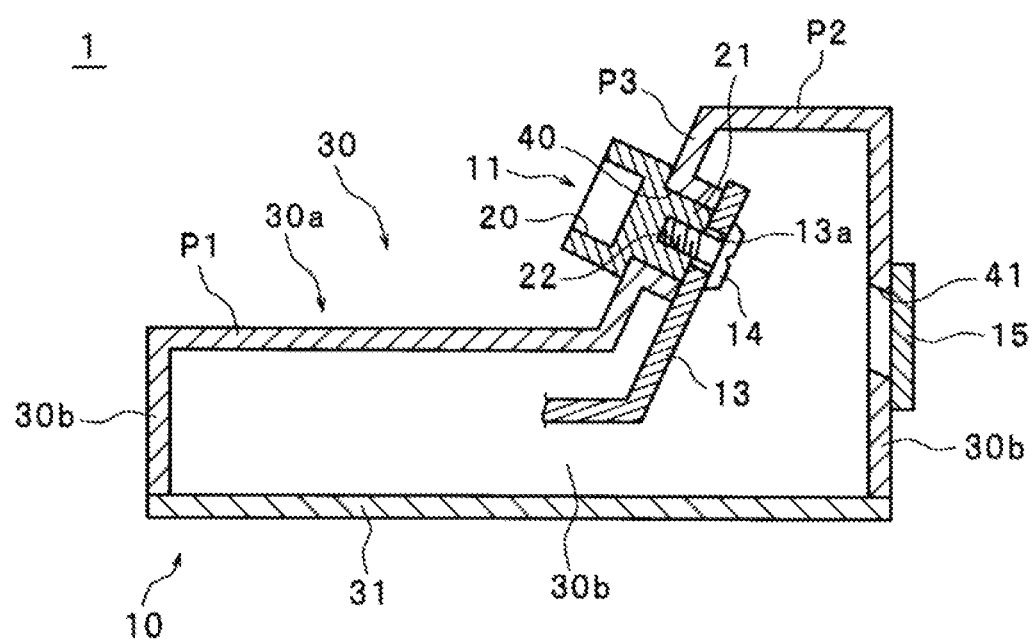

[FIG. 4]
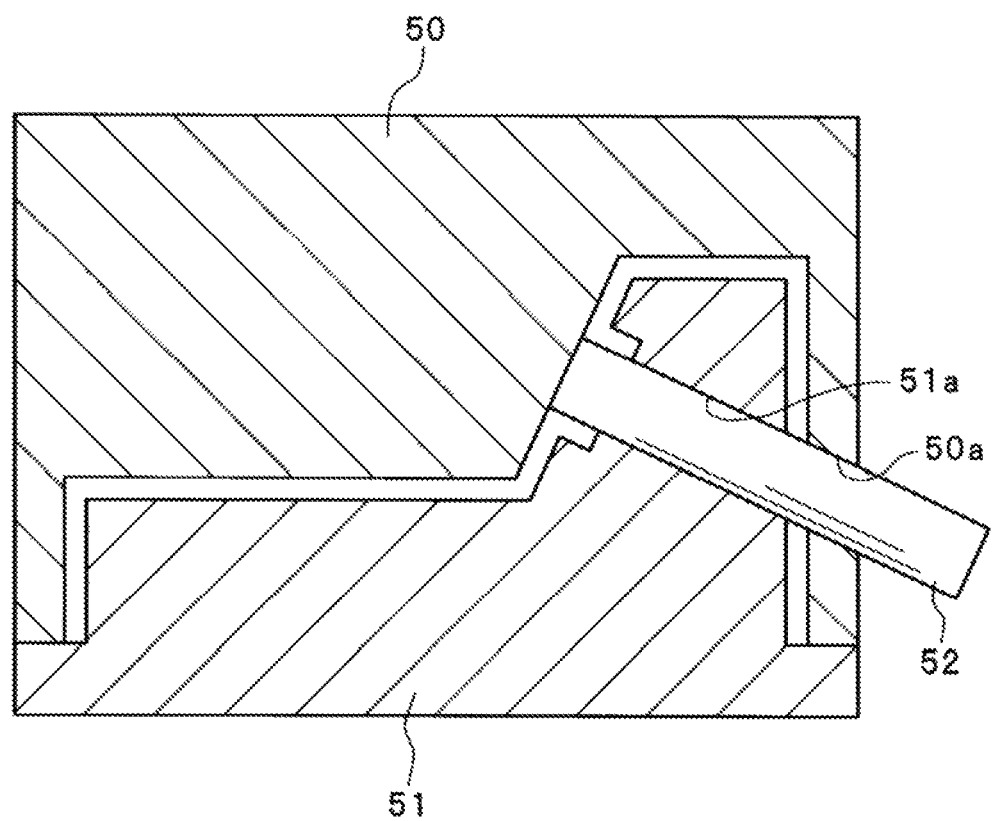

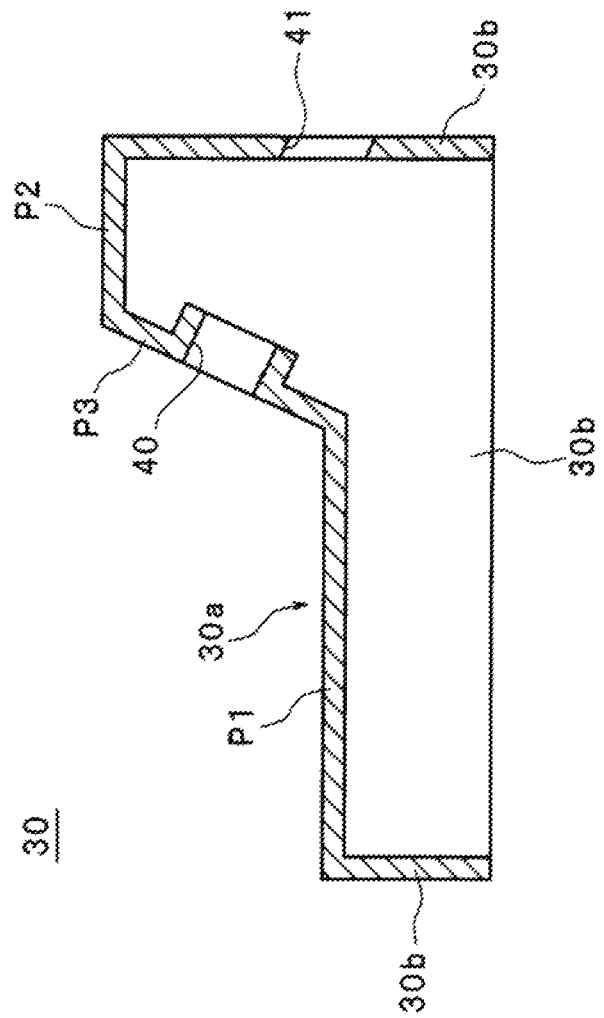

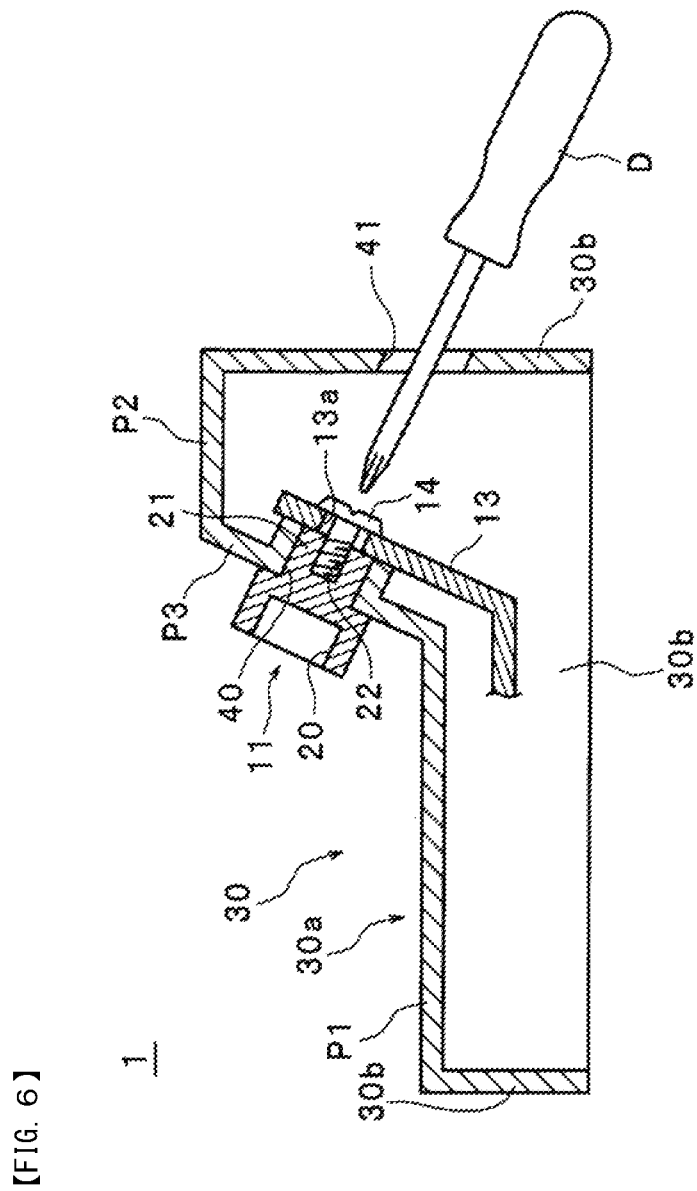
[FIG. 6]

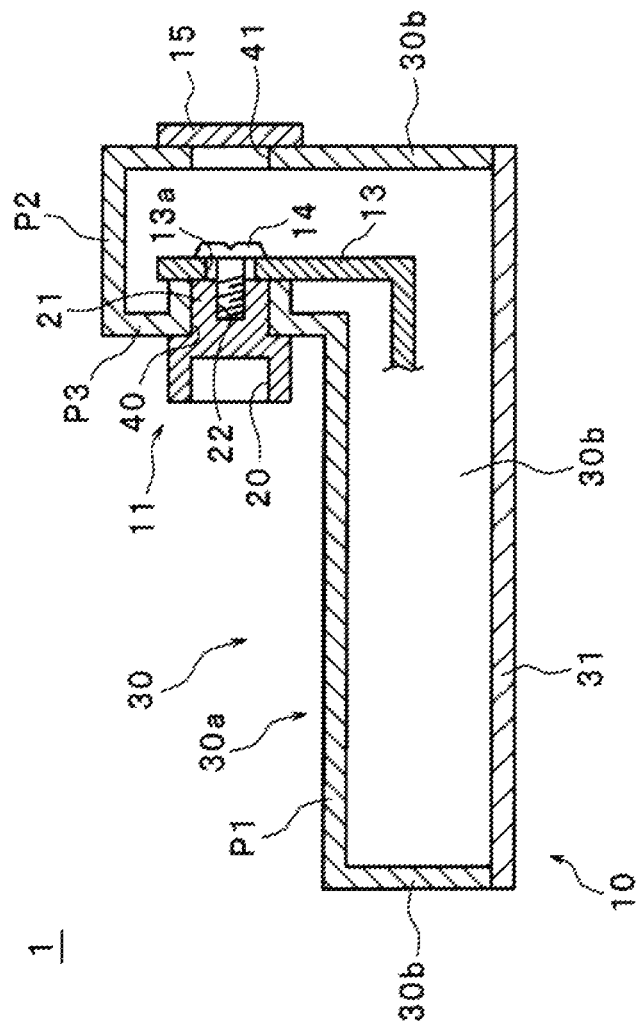
[FIG. 7]

ELECTRICAL JUNCTION BOX AND METHOD FOR MANUFACTURING ELECTRICAL JUNCTION BOX

CROSS-REFERENCE TO RELATED APPLICATIONS

This application claims priority of Japanese Patent Application No. JP 2018-172752 filed on Sep. 14, 2018, the contents of which are incorporated herein.

TECHNICAL FIELD

The present disclosure relates to an electrical junction box and a method for manufacturing an electrical junction box.

BACKGROUND

An electrical junction box (see, e.g., JP 2014-236621A) that connects a plurality of vehicle-mounted devices is often mounted in a vehicle. The electrical junction box disclosed in JP 2014-236621A includes a plurality of connectors. Connectors connected to the vehicle-mounted devices are mounted to the connectors. Thus, the plurality of vehicle-mounted devices are connected to the electrical junction box. The electrical junction box disclosed in JP 2014-236621A supplies power that has been supplied from one vehicle-mounted device to another vehicle-mounted device, for example.

SUMMARY

In an electrical junction box that connects a plurality of vehicle-mounted devices, it is necessary to attach a conductor to each connector. The placement position of each connector of the electrical junction box is determined according to the specifications of a vehicle in which the electrical junction box is to be mounted. Therefore, in the electrical junction box, the connector may be disposed in a place where the space for attaching the conductor is narrow.

When the connector is disposed in a place where the space for attaching the conductor is narrow in the conventional electrical junction box as described in JP 2014-236621A, the conductor cannot be easily attached to the connector. This poses a problem that the time required for production is long.

The present disclosure has been made in view of such circumstances, and it is an object of the disclosure to provide an electrical junction box for which the time required for production is short, and a method for manufacturing the electrical junction box.

An electrical junction box according to an aspect of the present disclosure is an electrical junction box configured to house an electric device, and connect a plurality of external devices to each other via the housed electric device, including: a connector; and a housing box in which the electric device is to be housed, wherein the housing box includes: an insertion port into which the connector is inserted; and an opposite opening that is opposite to the insertion port, and the insertion port and the opposite opening have the same axial direction.

A method for manufacturing an electrical junction box according to an aspect of the present disclosure is a method for manufacturing an electrical junction box configured to house an electric device in an housing box including an insertion port into which a connector is inserted, and an opposite opening having the same axial direction as that of the insertion port, and being opposite to the insertion port, and connect a plurality of external devices to each other via the housed electric device, the method including the step of: inserting the connector into the insertion port; inserting, from the opposite opening, an attachment tool for attaching a conductor to the connector; and attaching the conductor to the connector using the attachment tool.

According to the above-described aspects, the time required for production is short.

BRIEF DESCRIPTION OF THE DRAWINGS

FIG. 3 is a cross-sectional view of the electrical junction box;

FIG. 4 is a diagram illustrating a method for manufacturing a box body;

FIG. 5 is a cross-sectional view of the box body;

FIG. 6 is a diagram illustrating a method for manufacturing the electrical junction box; and FIG. 7 is a cross-sectional view of an electrical junction box according to Embodiment 2.

DETAILED DESCRIPTION OF PREFERRED EMBODIMENTS

Figure 1:
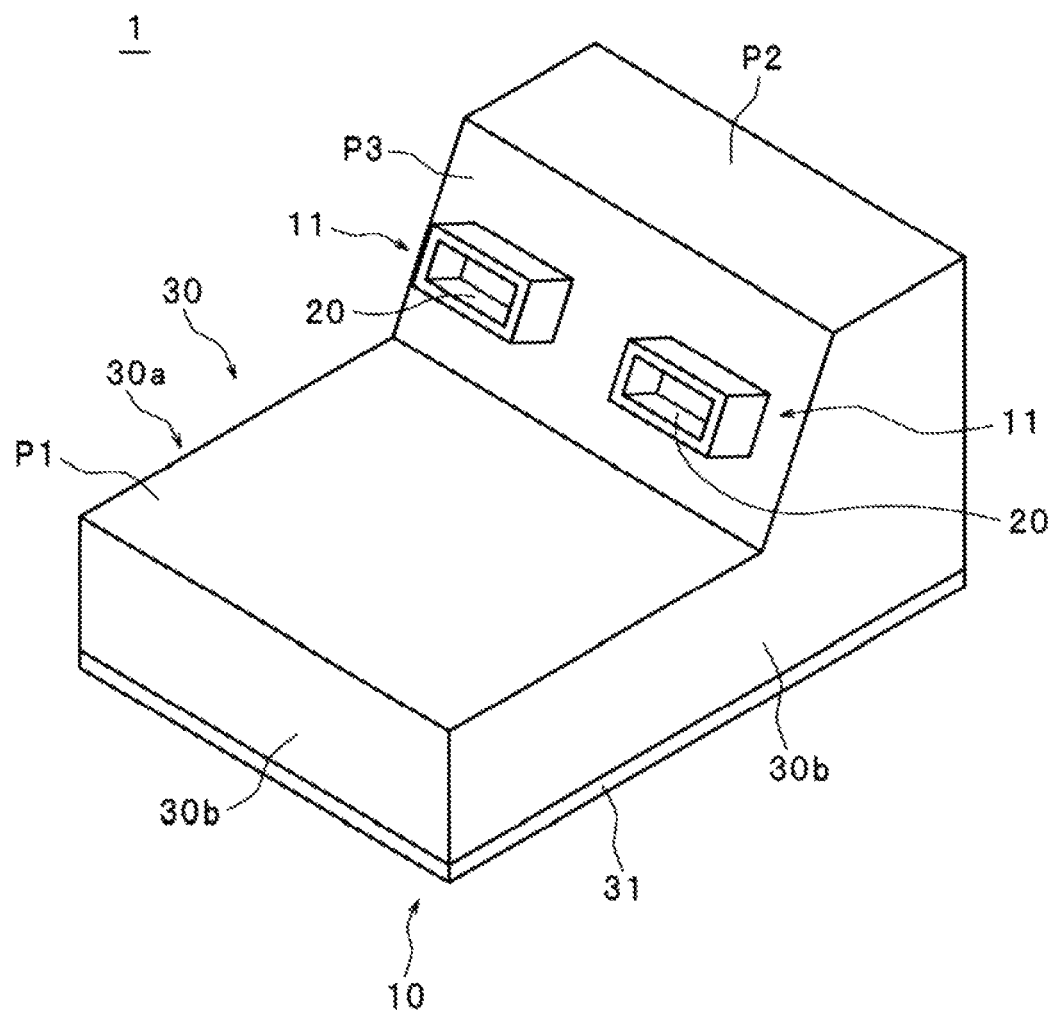
FIG. 1 is an external view of an electrical junction box according to Embodiment 1.

First, aspects of the present disclosure will be listed and described. At least some of the aspects described below may be combined freely.

An electrical junction box according to an aspect of the present disclosure is an electrical junction box configured to house an electric device, and connect a plurality of external devices to each other via the housed electric device, including: a connector; and a housing box in which the electric device is to be housed, wherein the housing box includes: an insertion port into which the connector is inserted; and an opposite opening that is opposite to the insertion port, and the insertion port and the opposite opening have the same axial direction.

In the above-described aspect, the connector is inserted into the insertion port of the housing box. An attachment tool, such as a driver, for attaching a component to the connector can be inserted from the opposite opening. This makes it possible to easily attach the component to the connector. As a result, the time required for production is short.

In an electrical junction box according to an aspect of the present disclosure, an outer shell plate that forms an outer shell of the housing box includes a rising portion that rises toward an outer side of the housing box, and the insertion port is provided at the rising portion.

In the above-described aspect, when the insertion port is provided at the rising portion of the outer shell plate of the housing box, it is highly likely that the space inside the housing box for attaching a component to the connector is narrow. Accordingly, a significant effect can be achieved as a result of the housing box having the opposite opening.

In an electrical junction box according to an aspect of the present disclosure, the rising portion has a rising angle of less than 90 degrees.

In the above-described aspect, the insertion port is provided at the rising portion of the outer shell plate that rises obliquely.

An electrical junction box according to an aspect of the present disclosure includes: a conductor; and an attachment member configured to attach the conductor to the connector inside the housing box.

In the above-described aspect, the connector is inserted into the insertion port of the housing box, and the conductor is attached to the connector using the attachment member such as a screw. When the attachment member is a screw, it is possible to insert a driver into the opposite opening, and fasten the screw with the driver.

A method for manufacturing an electrical junction box according to an aspect of the present disclosure is a method for manufacturing an electrical junction box configured to house an electric device in an housing box including an insertion port into which a connector is inserted, and an opposite opening having the same axial direction as that of the insertion port, and being opposite to the insertion port, and connect a plurality of external devices to each other via the housed electric device, the method including the step of: inserting the connector into the insertion port; inserting, from the opposite opening, an attachment tool for attaching a conductor to the connector; and attaching the conductor to the connector using the attachment tool.

In the above-described aspect, the attachment tool for attaching a component to the connector is inserted from the opposite opening, and the conductor is attached to the connector using the attachment tool. Accordingly, it is possible to easily attach the conductor to the connector. As a result, the time required for production is short.

Specific examples of an electrical junction box according to embodiments of the present disclosure will be described below with reference to the drawings. It should be note that the present disclosure is not limited to these examples, and is intended to include all modifications which fall within the scope of the claims and the meaning and scope of equivalents thereof.

Embodiment 1

FIG. 1 is an external view of an electrical junction box 1 according to Embodiment 1. The electrical junction box 1 includes a housing box 10 that has the shape of a hollow rectangular solid. In the electrical junction box 1, the housing box 10 is provided with a plurality of connectors 11, 11, . . . . FIG. 1 shows an example in which the number of connectors 11 is two. Each connector 11 has the shape of a rectangular solid. The connector 11 is provided with a tubular recess 20 that is recessed inward.

Figure 2:
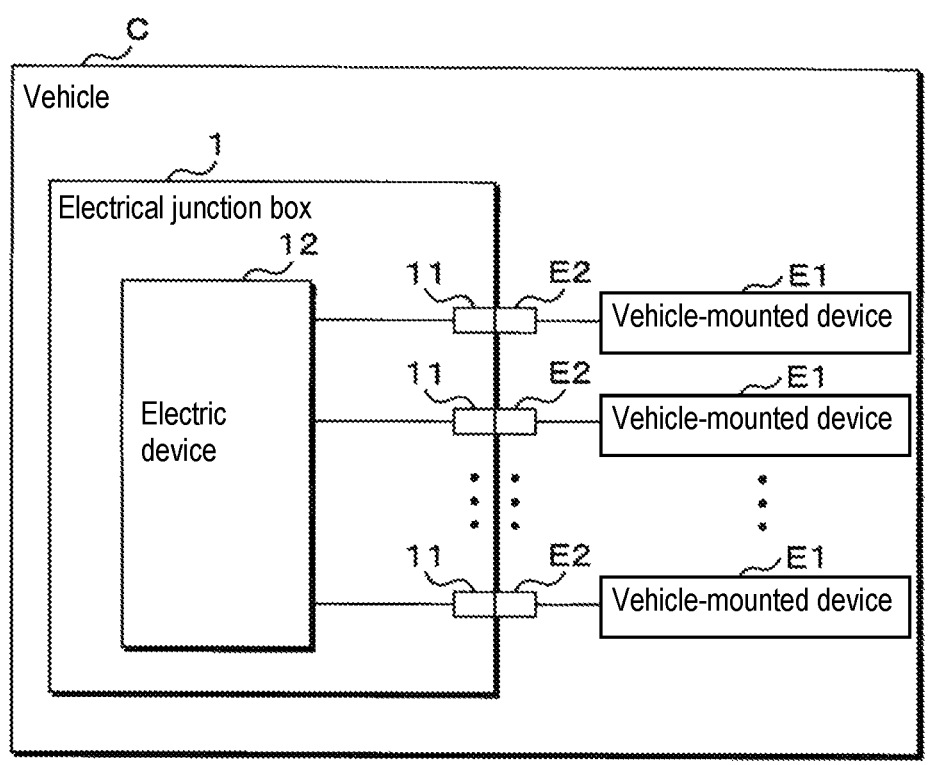
FIG. 2 is a block diagram illustrating operations of the electrical junction box.

FIG. 2 is a block diagram illustrating operations of the electrical junction box 1. The electrical junction box 1 is mounted in a vehicle C. In the electrical junction box 1, an electric device 12 is housed in the housing box 10. The electric device 12 is separately connected to each of the plurality of connectors 11, 11, . . . . A connector E2 is connected to each vehicle-mounted device E1. The connector E2 is inserted into the recess 20 of the corresponding connector 11, and the connector E2 is mounted to the connector 11. When the connector E2 is mounted to the connector 11, the electric device 12 is connected to the corresponding vehicle-mounted device E1.

When a plurality of connectors E2, E2, . . . are respectively mounted to a plurality of connectors 11, 11, . . . , each of the plurality of vehicle-mounted devices E1, E1, . . . is connected to at least one of the other vehicle-mounted devices E1, E1, . . . via the electric device 12.

As described above, the electrical junction box 1 houses the electric device 12 housed in the housing box 10, and connects the plurality of vehicle-mounted devices E1, E1, . . . to each other via the electric device 12 housed in the housing box 10. Each vehicle-mounted device E1 functions as an external device.

Each vehicle-mounted device E1 is a battery, a lamp, a motor, or the like. It is assumed that one of the plurality of vehicle-mounted devices E1, E1, . . . is a battery, and each of the remaining vehicle-mounted devices E1, E1 . . . is a lamp, a motor, or the like. As a first example, the electric device 12 includes a plurality of fuses, and the battery is connected to the remaining vehicle-mounted devices E1, E1, . . . via the plurality of fuses. The electric device 12 protects the remaining vehicle-mounted devices E1, E1, . . . form an overcurrent.

As a second example, the electric device 12 is a DC/DC converter that transforms the DC voltage. In this case, the electric device 12 transforms the output voltage of the battery, and outputs the transformed voltage to the remaining vehicle-mounted devices E1, E1, . . . . As a third example, the electric device 12 includes a plurality of switches, and the battery is connected to the remaining vehicle-mounted devices E1, E1, . . . via the plurality of switches. The vehicle-mounted device E1 to which power is supplied from the battery is switched by changing each of the plurality of switches to on and off.

FIG. 3 is a cross-sectional view of the electrical junction box 1. As shown in FIGS. 1 and 3, the housing box 10 includes a box body 30 having an open surface. In the housing box 10, the open surface of the box body 30 is closed by a flat plate-shaped first lid body 31. The box body 30 and the first lid body 31 form an outer shell of the housing box 10. The box body 30 includes a rectangular bottom plate 30a. In the box body 30, a side plate 30b protrudes from each side portion of the bottom plate 30a. The bottom plate 30a and the plurality of side plates 30b, 30b, . . . also form the outer shell of the housing box 10. Accordingly, the bottom plate 30a, the plurality of side plates 30b, 30b, . . . , and the first lid body 31 each function as an outer shell plate that forms the outer shell of the housing box 10.

The plurality of side plates 30b, 30b, . . . protruding from the bottom plate 30a protrude in the same direction. Two adjacent side plates 30b, 30b are coupled. End faces of the protruding ends of the plurality of side plates 30b, 30b, . . . protruding from the bottom plate 30a are continuous. The first lid body 31 is disposed on the end faces of the protruding ends of the plurality of side plates 30b, 30b, . . . . Consequently, the open surface of the box body 30 is closed by the first lid body 31. The plate surface of the first lid body 31 is opposite to the plate surface of the bottom plate 30a of the box body 30.

The plate surface of the bottom plate 30a is bent at two locations. Consequently, on the bottom plate 30a, a first flat plate portion P1 and a second flat plate portion P2 whose plate surfaces extend parallel to the plate surface of the first lid body 31, and a plate-shaped coupling portion P3 that couples the first flat plate portion P1 and the second flat plate portion P2 are formed. The distance between the second flat plate portion P2 and the first lid body 31 is longer than the distance between the first flat plate portion P1 and the first lid body 31.

The coupling portion P3 rises from an end portion of the first flat plate portion P1 toward the outer side of the housing box 10. The rising angle, relative to the left-right direction in FIG. 3, of the plate surface of the first flat plate portion P1, or in other words, the coupling portion P3, exceeds 0 degrees and is less than 90 degrees. A recessed portion that is recessed outward is formed by the second flat plate portion P2 and the coupling portion P3 of the bottom plate 30a, and the side plate 30b that is opposite to the coupling portion P3. Insertion ports 40 penetrating in the inward-outward direction are provided at the coupling portion P3 of the bottom plate 30a that rises obliquely. The coupling portion P3 functions as a rising portion.

Each connector 11 is provided with a columnar protruding portion 21 that protrudes from the central portion of the bottom wall of the recess 20 in a direction perpendicular to that bottom wall. The protruding portion 21 protrudes in a direction away from the recess 20, along the axial direction of the recess 20. The protruding portion 21 of the connector 11 is inserted into the insertion port 40 of the housing box 10. A portion of the bottom wall of the recess 20 abuts against the bottom plate 30a located around the periphery of the insertion port 40. In the connector 11, a screw hole 22 is provided in the end face of the protruding end of the protruding portion 21. The length of the protruding portion 21 in the axial direction substantially matches the length of the insertion port 40 in the axial direction. The shape of the outer contour of the end face of the protruding end of the protruding portion 21 substantially matches the opening of the insertion port 40.

The housing box 10 houses, in addition to the electric device 12, a conductive plate 13 that is attached to each connector 11. The conductive plate 13 is the so-called bus bar. A current flows via the conductive plate 13. A through hole 13a penetrating in the thickness direction of the conductive plate 13 is provided in the conductive plate 13. The screw portion of the screw 14 passes through the through hole 13a. The screw portion of the screw 14 that has passed through the through hole 13a is inserted into the screw hole 22 of the connector 11, and the screw 14 is fastened.

Consequently, the head portion of the screw 14 abuts against a peripheral edge portion of the through hole 13a on the conductive plate 13, and the connector 11 and the screw 14 sandwiches the conductive plate 13. The connector 11 and the conductive plate 13 sandwiches the bottom plate 30a. Inside the housing box 10, the conductive plate 13 is attached to the connector 11 with the screw 14 in a state in which the protruding end of the protruding portion 21 of the connector 11 is in contact with the plate surface of the conductive plate 13. The conductive plate 13 and the screw 14 function as a conductor and an attachment member, respectively.

The conductive plate 13 is connected to the electric device 12. A current flows through the conductive plate 13 and the electric device 12 in that order, or flows through the electric device 12 and the conductive plate 13 in that order. Accordingly, when the connector E2 connected to the vehicle-mounted device E1 is mounted to the connector 11 of the electrical junction box 1, the electric device 12 is connected to the vehicle-mounted device E1 via the conductive plate 13.

An opposite opening 41 that is opposite to the insertion port 40 is provided in the side plate 30b that is opposite to the plate surface of the coupling portion P3 of the bottom plate 30a. The opposite opening 41 penetrates the side plate 30b of the housing box 10 in the inward-outward direction of the housing box 10. The axial direction of the opposite opening 41 substantially coincides with the axial direction of the insertion port 40. In the electrical junction box 1, the opposite opening 41 is closed by a second lid body 15.

Note that the coincidence between the axial directions of the insertion port 40 and the opposite opening 41 does not only means complete coincidence. It is sufficient that the axial directions of the insertion port 40 and the opposite opening 41 substantially coincide with each other. The insertion port 40 into which the connector 11 is inserted may be provided at, in addition to the coupling portion P3 of the bottom plate 30a, a portion other than the coupling portion P3 in the housing box 10. Furthermore, the number of insertion ports 40 matches the number of connectors 11. In the example shown in FIG. 1, the number of connectors 11 is two, and the two connectors 11 and 11 are provided at the coupling portion P3 of the bottom plate 30a as described above.

Next, a method for manufacturing the box body 30 of the housing box 10 will be described. FIG. 4 is a diagram illustrating a method for manufacturing the box body 30. The box body 30 is produced using a first mold 50, a second mold 51, and a columnar pin 52. FIG. 4 shows a cross-sectional view of the first mold 50 and the second mold 51. The pin 52 extends linearly. The first mold 50 and the second mold 51 are respectively provided with insertion holes 50a and 51a through which the pin 52 is passed.

When the first mold 50 and the second mold 51 are combined, the insertion holes 50a and 51a are continuous. The pin 52 is inserted into the insertion holes 50a and 51a in a state in which the first mold 50 and the second mold 51 are combined. Consequently, a cavity corresponding to the box body 30 is formed. Resin is injected into this cavity, and the inject resin is cured. Thereafter, the pin 52 is pulled out of the first mold 50 and the second mold 51. Next, the first mold 50 and the second mold 51 are removed from the resin. Consequently, a box body 30 is produced.

FIG. 5 is a cross-sectional view of the box body 30. In the arrangement direction of the first flat plate portion P1, the coupling portion P3, and the second flat plate portion P2, i.e., the left-right direction in FIG. 5, the length of the second flat plate portion P2 is sufficiently shorter than the length of the first flat plate portion P1. Accordingly, in a state in which the first mold 50 and the second mold 51 are combined, and the pin 52 is inserted thereinto, the length of the portion where the pin 52 is inserted, i.e., the length from the outer surface of the first mold 50 to the portion where the insertion port 40 is to be formed is short.

For example, in the case of manufacturing a box body provided with no opposite opening 41, the insertion direction of the pin is a direction from the upper left to the lower right in FIG. 4, which is opposite to the insertion direction of the pin 52 in the case of manufacturing the box body 30. In the case of manufacturing the box body 30, a first mold 50 and a second mold 51 into which the pin 52 is inserted from the right side is formed in FIG. 4. On the other hand, in the case of manufacturing a box body provided with no opposite opening 41, it is necessary to produce a first mold and a second mold into which the pin 52 is inserted from the left side in FIG. 4.

In this case, it is necessary to use a large mold as the first mold, and, therefore, the cost required to form the first mold and the second mold will increase. Furthermore, in the first mold, the length from the outer surface to the portion where the insertion port 40 is to be formed is long. The insertion hole can be formed, for example, by cutting out a metal from the outer side of the first mold. Accordingly, when the length to the portion where the insertion port 40 is to be formed is long, axial displacement of an insertion hole formed through cutting results in a significant positional displacement of the insertion port 40. Therefore, it is difficult to form a first mold and a second mold that allow the insertion port 40 to be formed at an accurate position.

However, in the case of manufacturing the box body 30, a first mold 50 and a second mold 51 into which the pin 52 is inserted from the right side is formed in FIG. 4. Furthermore, the length to the portion where the insertion port 40 is to be formed is short. Accordingly, the cost for forming the first mold 50 and the second mold 51 is low, and a first mold 50 and a second mold 51 that allow the insertion port 40 to be formed at an accurate position can be easily formed.

FIG. 6 is a diagram illustrating a method for manufacturing the electrical junction box 1. The protruding portion 21 of the connector 11 is inserted into the insertion port 40 provided on the bottom plate 30a of the box body 30. Next, the screw portion of the screw 14 is passed through the through hole 13a of the conductive plate 13, and the screw portion of the screw 14 that has passed through the through hole 13a is inserted into the screw hole 22 of the connector 11. Thereafter, a driver D for fastening the screw 14, i.e., an attachment tool for attaching the conductive plate 13 to the connector 11, is inserted into the housing box 10 from the opposite opening 41. Thereafter, the screw 14 is fastened using the driver D. Consequently, the connector 11 and the head portion of the screw 14 sandwich the conductive plate 13, and the conductive plate 13 is attached to the connector 11. As described above, the box body 30 is provided with the opposite opening 41, and thus makes it possible to insert the driver D into the opposite opening 41, and fasten the screw 14.

For a box body provided with no opposite opening 41, the space inside the box body is narrow, and it is therefore difficult to attach the conductive plate 13 to the connector 11. On the other hand, the box body 30 is provided with the opposite opening 41, and thus makes it possible to easily attach the conductive plate 13, which is a component of the electrical junction box 1, to the connector 11. As a result, the time required to manufacture the electrical junction box 1 is short.

When the insertion port 40 is provided at the coupling portion P3 of the bottom plate 30a in the box body 30, it is highly likely that the space inside the housing box for attaching the conductive plate 13 to the connector 11 with the screw 14 10 is narrow as shown in FIG. 6. Accordingly, a significant effect can be achieved as a result of the housing box 10 being provided with the opposite opening 41.

A plurality of opposite openings 41, 41, . . . respectively corresponding to a plurality of insertion ports 40, 40, . . . provided at the coupling portion P3 are provided in the side plate 30b that is opposite to the coupling portion P3 of the bottom plate 30a. The connectors 11 are inserted into the respective insertion ports 40, and the screws 14 are fastened with the driver D to attach the conductive plates 13 to the respective connectors 11.

Thereafter, the electric device 12 is housed in the housing box 10, and a plurality of conductive plates 13, 13, . . . are attached to the electric device 12. Next, one surface of the box body 30 that is open is closed by the first lid body 31, and each of the opposite openings 41 is closed by the second lid body 15. Consequently, an electrical junction box 1 is produced. In the example shown in FIG. 1, the number of insertion ports 40 provided at the coupling portion P3 is two.

Note that the number of insertion ports 40 provided at the coupling portion P3 may be one. In this case, the number of opposite openings 41 is also one.

Embodiment 2

In the electrical junction box 1 according to Embodiment 1, the rising angle of the coupling portion P3 that rises toward the outer side of the housing box 10 exceeds 0 degrees and is less than 90 degrees. However, the rising angle of the coupling portion P3 is not limited to an angle that exceeds 0 degrees and is less than 90 degrees.

In the following, aspects in which Embodiment 2 differs from Embodiment 1 will be described. Components of Embodiment 2 other than those described below are the same as those of Embodiment 1. Therefore, the components that are the same as those of Embodiment 1 are denoted by the same reference numerals as Embodiment 1, and the description thereof has been omitted.

FIG. 7 is a cross-sectional view of an electrical junction box 1 according to Embodiment 2. As shown in FIG. 7, for the bottom plate 30a of the box body 30, the rising angle of the coupling portion P3 is 90 degrees. The angle formed by the coupling portion P3 and the plate surface of the second flat plate portion P2 is also 90 degrees.

In the box body 30 of Embodiment 2 as well, a recessed portion that is outwardly recessed is formed by the second flat plate portion P2 and the coupling portion P3 of the bottom plate 30a, and the side plate 30b that is opposite to the coupling portion P3. Accordingly, the space inside the housing box 10 for attaching the conductive plate 13 to the connector 11 with the screw 14 is narrow. However, since the opposite opening 41 is provided, it is possible to easily attach the conductive plate 13, which is a component of the electrical junction box 1, to the connector 11, and the time required to manufacture the electrical junction box 1 is short. The electrical junction box 1 according to Embodiment 2 is produced in the same manner as in Embodiment 1.

The electrical junction box 1 according to Embodiment 2 similarly achieves the effects achieved by the electrical junction box 1 according to Embodiment 1.

In Embodiments 1 and 2, the attachment member for attaching the conductive plate 13 to the connector 11 is not limited to the screw 14. The attachment member may be, for example, solder. In this case, the attachment tool is a soldering iron. When the attachment member is solder, it is also possible to easily attach the conductive plate 13 to the connector 11 by inserting the soldering iron from the opposite opening 41.

Alternatively, the attachment member may be, for example, a member that sandwiches the connector 11 and the conductive plate 13. In this case as well, it is possible to allow the attachment member to easily sandwich the connector 11 and the conductive plate 13 by inserting a hand from the opposite opening 41.

Furthermore, in place of the conductive plate 13, a conductor having a shape different from a plate shape can be attached to the connector 11. The plate on which the rising portion that rises toward the outer side of the housing box 10 is formed is not limited to the bottom plate 30a, and may be the side plate 30b, the first lid body 31, or the like.

It should be appreciated that Embodiments 1 and 2 disclosed herein are to be construed in all respects as illustrative and not limiting. The scope of the present disclosure is defined by the claims, rather than the description of the embodiments above, and is intended to include all modifications which fall within the scope of the claims and the meaning and scope of equivalents thereof

What is claimed is:

1. An electrical junction box configured to house an electric device, and connect a plurality of external devices to each other via the housed electric device, comprising:
　　a connector; and
　　a housing box including a plurality of side plates defining an open surface closed by a first lid body so as to define an interior space in which the electric device is to be housed, wherein the housing box includes:
an insertion port into which the connector is inserted;
an opposite opening that is opposite to the insertion port, the insertion port and the opposite opening have the same axial direction; and
a conductive plate disposed within the interior space, the opposite opening providing access to the connector so as to facilitate an attachment of the conductive plate to the connector.

2. The electrical junction box according to claim 1, wherein the plurality of side plates and the first lid body defines an outer shell plate that forms an outer shell of the housing box and includes a rising portion that rises toward an outer side of the housing box, and
the insertion port is provided at the rising portion.

3. The electrical junction box according to claim 2, wherein the rising portion has a rising angle of less than 90 degrees.

4. The electrical junction box according to claim 1, comprising:
an attachment member configured to attach the conductive plate to the connector inside the housing box.

5. A method for manufacturing an electrical junction box configured to house an electric device in an housing box including a plurality of side plates defining an open surface closed by a first lid body so as to define an interior space, the housing box including an insertion port into which a connector is inserted, and an opposite opening having the same axial direction as that of the insertion port, and being opposite to the insertion port, and connect a plurality of external devices to each other via the housed electric device, the method comprising the step of:
inserting the connector into the insertion port;
inserting, from the opposite opening, an attachment tool for attaching a conductive plate to the connector; and
attaching the conductor to the connector using the attachment tool.

6. The electrical junction box according to claim 2, comprising:
an attachment member configured to attach the conductive plate to the connector inside the housing box.

7. The electrical junction box according to claim 3, comprising:
an attachment member configured to attach the conductive plate to the connector inside the housing box.

8. The electrical junction box according to claim 1, further including a second lid body configured to close the opposite opening.

9. The method according to claim 5, further including the step of closing the opposite opening with a second lid body.

* * * * *